(12) United States Patent
Senge

(10) Patent No.: US 8,925,996 B2
(45) Date of Patent: Jan. 6, 2015

(54) VEHICLE GLAZING

(75) Inventor: Christoph Senge, Dillingen (DE)

(73) Assignee: Pilkington Group Limited, Merseyside (GB)

( * ) Notice: Subject to any disclaimer, the term of this patent is extended or adjusted under 35 U.S.C. 154(b) by 192 days.

(21) Appl. No.: 13/391,338

(22) PCT Filed: Aug. 4, 2010

(86) PCT No.: PCT/GB2010/051288
§ 371 (c)(1),
(2), (4) Date: Feb. 20, 2012

(87) PCT Pub. No.: WO2011/021021
PCT Pub. Date: Feb. 24, 2011

(65) Prior Publication Data
US 2012/0153659 A1   Jun. 21, 2012

(30) Foreign Application Priority Data
Aug. 20, 2009   (GB) .................................. 0914571.5

(51) Int. Cl.
*B60J 10/02* (2006.01)
*F16B 2/22* (2006.01)
*B60J 10/00* (2006.01)
*F16B 2/20* (2006.01)

(52) U.S. Cl.
CPC .............. *B60J 10/02* (2013.01); *B60J 10/0051* (2013.01); *B60J 10/0062* (2013.01)
USPC .................... 296/146.15; 52/716.5; 52/717.01

(58) Field of Classification Search
CPC ............. B60J 10/00; B60J 10/02; E06B 3/54; E06B 3/60; E06B 3/62; F16B 2/20; F16B 2/22; F16B 2/24; F16B 2/245; F16B 5/12; F16B 5/123; F16B 5/125; F16B 5/126; F16B 5/128
USPC ........ 296/93, 146.15; 49/489.1, 490.1, 492.1; 52/204.53, 204.61, 204.7, 204.705, 52/716.5, 716.6, 716.7, 717.01, 717.06, 52/718.01, 718.02, 718.03, 718.04, 52/718.05, 718.06, 718.07
See application file for complete search history.

(56) References Cited

U.S. PATENT DOCUMENTS 2,606,635 A * 8/1952 Clingman ................ 52/204.597
2,647,289 A * 8/1953 Harbert ........................... 52/208
(Continued)

FOREIGN PATENT DOCUMENTS

CN   101228041 A   7/2008
DE   2756207 A1    6/1979
(Continued)

OTHER PUBLICATIONS

United Kingdom Search Report issued Nov. 26, 2009 by the United Kingdom Patent Office, in the corresponding United Kingdom Patent Application No. GB0914571.5. (2 pages).
(Continued)

*Primary Examiner* — Glenn Dayoan
*Assistant Examiner* — Paul Chenevert
(74) *Attorney, Agent, or Firm* — Buchanan Ingersoll & Rooney PC

(57) ABSTRACT

A vehicle glazing has a gasket provided on at least one surface and extending along one edge of the glazing, and provided with at least one resilient asymmetric metal retaining clip for retaining a vehicle glazing component, such as a decorative trim. One side of the clip engages the gasket, and the other side retains the vehicle glazing component. Also disclosed is a preferred retaining clip for mounting on a gasket to retain a vehicle glazing component, the clip having a generally U-shaped section comprising a base and two limbs. The first limb may comprise at least two lugs extending in mutually diverging directions to grip the gasket, and the second limb may comprise a tab extending outwardly from the limb to engage the vehicle glazing component.

17 Claims, 3 Drawing Sheets

(56) References Cited

U.S. PATENT DOCUMENTS

| | | | | |
|---|---|---|---|---|
| 2,814,525 A | * | 11/1957 | Thomas | 296/93 |
| 3,968,613 A | | 7/1976 | Meyer | |
| 4,011,635 A | | 3/1977 | Meyer | |
| 4,147,005 A | | 4/1979 | Meyer | |
| 4,197,688 A | | 4/1980 | Mauer | |
| 4,249,356 A | * | 2/1981 | Noso | 52/716.5 |
| 4,278,286 A | * | 7/1981 | Kiba et al. | 296/93 |
| 4,401,340 A | * | 8/1983 | Ankrapp et al. | 296/93 |
| 4,840,001 A | * | 6/1989 | Kimisawa | 52/208 |
| 4,904,014 A | | 2/1990 | Azarovitz et al. | |
| 5,141,278 A | * | 8/1992 | Iwata et al. | 296/93 |
| 5,396,746 A | * | 3/1995 | Whitmer | 52/208 |
| 5,561,003 A | | 10/1996 | Nowosiadly | |
| 5,846,631 A | | 12/1998 | Nowosiadly | |
| 6,546,683 B1 | * | 4/2003 | Senge | 52/208 |
| 7,600,806 B2 | | 10/2009 | Arai et al. | |
| 7,918,058 B2 | | 4/2011 | Debailleul et al. | |
| 8,205,389 B1 | | 6/2012 | Kesh | |
| 8,505,262 B2 | * | 8/2013 | Senge | 52/716.5 |
| 2004/0117951 A1 | | 6/2004 | Nishimura et al. | |
| 2008/0012242 A1 | | 1/2008 | Brocke | |
| 2008/0030046 A1 | | 2/2008 | Krause | |
| 2008/0073939 A1 | | 3/2008 | Arai et al. | |
| 2008/0196353 A1 | | 8/2008 | Debailleul et al. | |
| 2009/0007511 A1 | | 1/2009 | Hause | |
| 2010/0237644 A1 | | 9/2010 | Senge | |
| 2010/0327622 A1 | | 12/2010 | Lauderlein et al. | |
| 2011/0042848 A1 | | 2/2011 | Ash et al. | |
| 2011/0192013 A1 | | 8/2011 | Drozd et al. | |
| 2013/0186018 A1 | | 7/2013 | Grandgirard et al. | |

FOREIGN PATENT DOCUMENTS

| | | | | |
|---|---|---|---|---|
| DE | 2756248 A | | 4/1980 | |
| DE | 3432592 A1 | | 3/1986 | |
| DE | 4428142 A1 | | 2/1996 | |
| DE | 102010011321 A1 | | 9/2011 | |
| EP | 0431964 A2 | | 6/1991 | |
| EP | 0792209 B1 | | 9/1998 | |
| EP | 2059415 A2 | | 5/2009 | |
| FR | 2340217 A1 | | 9/1977 | |
| FR | 2769886 A1 | | 4/1999 | |
| FR | 2886219 A1 | | 12/2006 | |
| GB | 2010369 A | | 6/1979 | |
| GB | 2010380 A | | 6/1979 | |
| GB | 2049010 A | | 12/1980 | |
| GB | 2078289 A | | 1/1982 | |
| GB | 2168741 A | | 6/1986 | |
| GB | 2313397 A | | 11/1997 | |
| GB | 2395740 A | | 6/2004 | |
| GB | 2397844 A | | 8/2004 | |
| JP | 60166514 A | * | 8/1985 | B60J 1/00 |
| JP | 61169716 U | | 10/1986 | |
| JP | 2002512915 A | | 5/2002 | |
| WO | 0134933 A1 | | 5/2001 | |
| WO | 2005009767 A2 | | 2/2005 | |
| WO | WO 2006010352 A1 | * | 2/2006 | B60J 10/02 |

OTHER PUBLICATIONS

Registered (European) Community Design No. 000835236-0001 published by the Register of Community Designs on Jul. 26, 2010 (2 pages).

International Search Report (PCT/ISA/210) issued on Oct. 4, 2010, by European Patent Office as the International Searching Authority for International Application No. PCT/GB2010/051288.

Japanese Office Action (Notification of Reasons for Refusal) dated Jun. 25, 2013, issued by the Japan Patent Office in corresponding Japanese Patent Application No. 525206/2012, and an English Translation of the Japanese Office Action. (11 pgs.)

English Translation of First Office Action issued on Jan. 13, 2014 by the Chinese Patent Office in corresponding Chinese Patent Application No. 201080036705.9. (10 pages).

* cited by examiner

VEHICLE GLAZING

The present invention relates to vehicle glazings having a gasket provided on at least one surface. More particularly, the present invention relates to vehicle glazings provided with retaining clips for retaining vehicle glazing components, to retaining clips for use with such glazings and to trims adapted to fit such glazings.

The appearance of an automotive vehicle, such as a car, is a key factor in successful sales. A number of features contribute to the overall appearance of a vehicle, one of which is the trim associated with the doors and windows. Finishers, such as chrome-finish (bright trim) or plastic strips, are often added to fixed windows by being mounted on the glazing itself, rather than on the body of the vehicle. Such bright finishers can be optional features on so-called "top of the range" models. Trims for openable glazings are often provided on the vehicle door or body.

There are several different ways in which such finishers can be mounted on or bonded to the surface of the glass. For example, when the glazing is encapsulated by a polymer frame (commonly known as a gasket) around its periphery, the trim may be included in the mould used for the encapsulation, and therefore bonded to the glazing by the polymer frame. The trim may be bonded to the glazing by a layer or multiple points of adhesive along its length. Alternatively, the trim may be clipped to the edge of the glazing, either directly, or via a holder that is bonded to the glazing.

One particular situation where it can be difficult to fit a trim or finisher onto a glazing is where the trim itself must lie close to the edge of the vehicle bodywork. Increasingly, vehicle manufacturers request that any optional trim applied to a glazing follows the contours of the vehicle in which the glazing is mounted. Furthermore, the extent and shape of the bright trim cross-section can vary from design to design which also dictates the space available for clipping or attachment. Often the glass surface must also extend under the bright trim, making the clipping design even more of a challenge. It may be necessary that the trim sits at slightly different heights along its length, which would require variable height encapsulation within the mould such that the trim could follow the height of the encapsulation, thus mimicking the vehicle contours. The space provided for a glazing trim is generally reducing and becoming closer to the surface of the vehicle glazing in modern vehicle designs, and it is becoming more and more likely that future vehicle designs will have even less space available for mounting such decorative trims.

GB 2 010 380 A discloses a plastics trim clip for a channel-shaped trim strip. The clip comprises a base with an upstanding rib along one side, a slot running along the base at an angle inclined to the rib for mounting on a stud, resilient fingers projecting upwardly and outwardly, and a shoulder. The trim strip is retained by the fingers and shoulder. This clip is intended for mounting on a stud welded to a panel, and not for mounting on a gasket.

It is therefore desirable to be able to fit a trim to a vehicle glazing regardless of the position of the trim with respect to the vehicle body when the vehicle glazing is in its final fitted position, and to provide sufficient flexibility in the mounting of the trim that complex vehicle bodywork designs can be enhanced with glazing trims.

Reducing the number and complexity of clips used in the design is also of prime importance to contain costs, whilst still achieving the demands for assembly robustness and bright trim detachment force.

Another aspect of good design for bright trim clips is their ability to avoid unwanted vehicle noises, such as rattles and squeaks and the like.

The present invention aims to address these problems.

The present invention accordingly provides, in a first aspect, a vehicle glazing having a gasket provided on at least one surface, the gasket extending along at least a portion of one edge of the glazing, and provided with at least one resilient asymmetric metal retaining clip for retaining a vehicle glazing component, wherein the retaining clip comprises a first limb having means for engaging the gasket, and a second limb having means for retaining the vehicle glazing component.

This is advantageous because the asymmetric retaining clip enables the use of significantly lower clearance so that the trim can be closer to the glass surface. Furthermore, it is advantageous to attach the vehicle glazing component to the gasket, rather than to the vehicle bodywork, and the retaining clip of the invention makes this possible.

A vehicle glazing component normally has at least two sides, and it is preferable to secure the vehicle glazing component on at least two sides. Preferably the retaining clip retains a first side of the vehicle glazing component, and the gasket comprises a retaining gasket portion for retaining a second side of the vehicle glazing component. Again, this is advantageous because it enables the use of a single retaining clip to retain a first side of the vehicle glazing component which enables the trim to be positioned much closer to the vehicle body than otherwise. Preferably, the retaining gasket portion is a protuberance shaped to fit the second side of the vehicle glazing component. The protuberance may be elongate, e.g. in the form of a shoulder. Using the protuberance on one side and the clip on the other can aid robustness and anti-noise properties.

Usually, the vehicle glazing component will be a glazing trim. The trim may be of various colours and materials. Currently, one of the more preferred trims is a bright trim of a metallic, preferably silver colour.

The gasket will usually comprise a channel adapted to receive the first side of the vehicle glazing component when the retaining clip is in position, the channel will also enable the asymmetric retaining clip portion to retain the first side of the vehicle glazing component, the width of the channel preferably being suitable for the asymmetric clip retaining portion to co-operate in fitting the first side of the vehicle glazing component.

The gasket will usually comprise a ridge, preferably a ridge recessed into the material of the gasket (i.e. closer to the glass surface, adapted to fit the retaining clip). The ridge will generally extend along the edge of the glass on which the gasket has been provided.

The ridge will preferably have an undercut region adapted to fit part of the retaining clip. More preferably, the undercut region will be on generally the same side of the retaining clip/ridge as the asymmetric retaining clip portion for retaining the first side of the vehicle glazing component. This is advantageous because the undercut region adapted to fit a part (e.g. a curved lip) of the retaining clip improves the efficiency and security of the fitting of the vehicle glazing component in the system.

Preferably the gasket also comprises a groove adapted to fit a part of the retaining clip. Preferably the groove is relatively narrow. More preferably, the groove is on the other side of the ridge from the undercut portion and is shaped to accommodate a barbed portion of the retaining clip.

In order for the retaining clip to sit securely in the gasket, it is preferred if the retaining clip is formed such that it comprises a channel portion adapted to fit the ridge of the gasket. The channel portion may be relatively short or may be elongate (elongation, for example, being along the axis of the ridge). Generally, the channel portion will comprise a back and arms/sidewall depending from the back.

The asymmetric retaining clip portion preferably comprises means for engaging the vehicle glazing component in the form of a flange or tab extending to one side of the clip suitable for fitting the first side of the vehicle glazing component.

Preferably, the channel portion of the retaining clip comprises means for engaging a gasket in the form of mutually diverging lugs or barbs, especially a first barb adapted to fit in the gasket groove, the first barb being directed partially towards the asymmetric clip portion. Preferably, the channel portion also comprises a second barb adapted to fit the gasket groove, the second barb being directed partially away from the asymmetric retaining clip portion. The first and/or second barbs are advantageous because fitting as they do in the narrow groove, they will resist withdrawal of the retaining clip and also provide, in cooperation with the flange of the asymmetric retaining clip portion, for a firm fitting of the vehicle glazing component into the gasket.

The retaining clip may have a U-shaped section. Preferably the retaining clip is elongate, especially elongate in a direction perpendicular to the plane of the "U" of the U-shaped section such that the clip is in the form of an elongate channel, having a U-shaped cross-section. When the clip is in use, mounted on a gasket, the direction of elongation will generally be along the ridge.

The retaining clip is preferably asymmetric with respect to a plane that bisects the U-shaped cross-section of the clip, and is perpendicular to the plane of the "U". In the case of an elongate clip, the plane of asymmetry will therefore also be parallel to the direction of elongation of the clip.

The gasket may be formed in situ on the sheet of glazing material, e.g. by encapsulation (injection moulding) or by extrusion and is generally of a polymer or polymers already known for use in forming gaskets on a vehicle glazing. Such polymers include polyurethanes, PVC, TPE-V, TPO, EPDM or other such known glass encapsulation materials.

The vehicle glazing of the present invention may further comprise a vehicle glazing component mounted on the retaining clip. Again, the vehicle glazing component is preferably a glazing trim although other glazing components may be accommodated including waterproof cowlings and/or water trays along the bottom edge of a windscreen, appliqué panels, wire harness carriers, covers etc.

In a second aspect, the present invention provides a vehicle glazing having a gasket provided on at least one surface, the gasket extending along at least a portion of one edge of the glazing, and being adapted to fit at least one retaining clip for retaining a vehicle glazing component, the retaining clip having an asymmetric retaining clip portion for retaining a first side of the vehicle glazing component. Thus, the present invention also contemplates the vehicle glazing having a gasket as described above including features adapted to fit a retaining clip but before attachment/fitting of the clip.

In a third aspect, the present invention provides a resilient asymmetric metal retaining clip for mounting on a gasket to retain a vehicle glazing component in the vicinity of the gasket, the retaining clip having a generally U-shaped section, the "U" comprising a base and two limbs, the first limb comprising means for engaging the gasket, and the second limb comprising means for engaging the vehicle glazing component, wherein the means for engaging the gasket comprises at least two lugs extending from the first limb in mutually diverging directions, and the second limb comprises a tab extending outwardly from the limb to engage the vehicle glazing component. Further features of the retaining clip may be generally as described above.

The present invention will now be described, by way of example, with reference to the accompanying drawings, in which.

Figure 1:
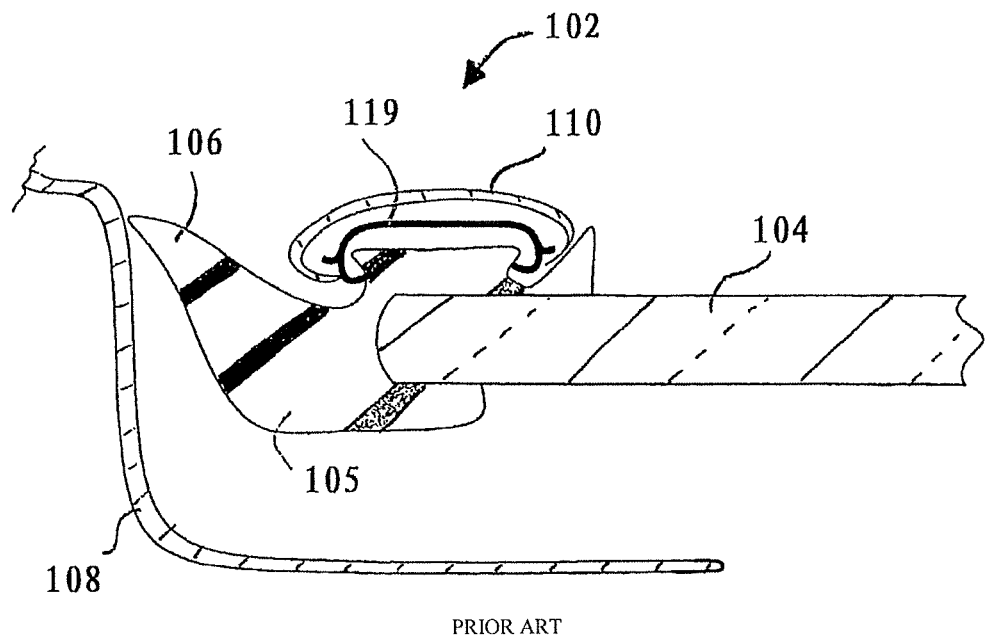
FIG. 1 is a schematic sectional view of a portion of the periphery of a known vehicle glazing illustrating the mounting position of a glazing trim.

FIG. 1 illustrates a known vehicle glazing 102 comprising a sheet 104 of glazing material, e.g. glass, and a gasket 105. The glazing is mounted within an aperture in a vehicle body 108 by means of a bead of adhesive (not shown) in contact with the gasket 105 provided around at least a portion of the periphery of the vehicle glazing 102. The gasket 105 comprises a lip portion 106 that bears against the edge of the aperture in the vehicle body 108. The main body of the gasket 105 is formed on the surface of the vehicle glazing 102 that faces away from the vehicle body. This is the portion of the gasket 105 that serves to mount a trim 110 along an edge of the vehicle glazing 102. However, the position of the trim 110 is very close to the edge of the vehicle body, resulting in tight tolerances when fitting the trim 110 on a glazing production line.

One option is to fit the trim into a mould before forming the gasket 105 via an injection moulding process and encapsulating the trim. However, this can be a relatively expensive process. A second option is to bond the trim 110 to the gasket 105 by means of an adhesive. However, the adhesive application and trim fixation must be done accurately, with no risk of any overspill, which would look unsightly, can be expensive and difficult to control bonding performance when mismatches in trim and gluing surface occur. In FIG. 1, the option of using a known type of retaining clip 119 is shown. The known retaining clip 119 is symmetrical and generally "C"-shaped in cross section and is sized to fit over a portion of the gasket 105. This clip can be used where space permits but works by clipping the trim on both sides/edges. Trim stability and strength depends largely on the clip alone, and the clip takes up additional space between the gasket and the vehicle body.

Figure 3:
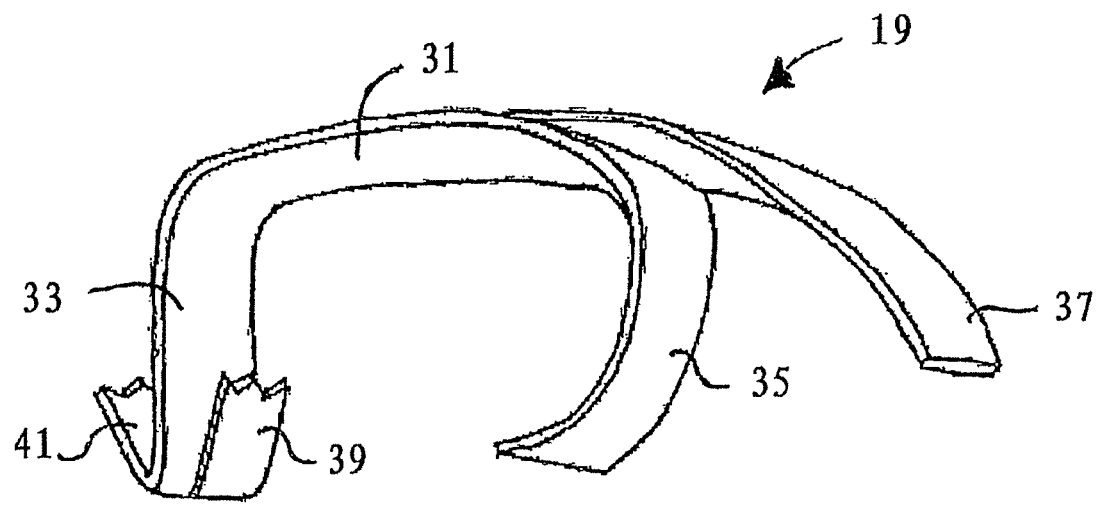
FIG. 3 is a schematic perspective view of a first embodiment of a retaining clip in accordance with the present invention.
Figure 2:
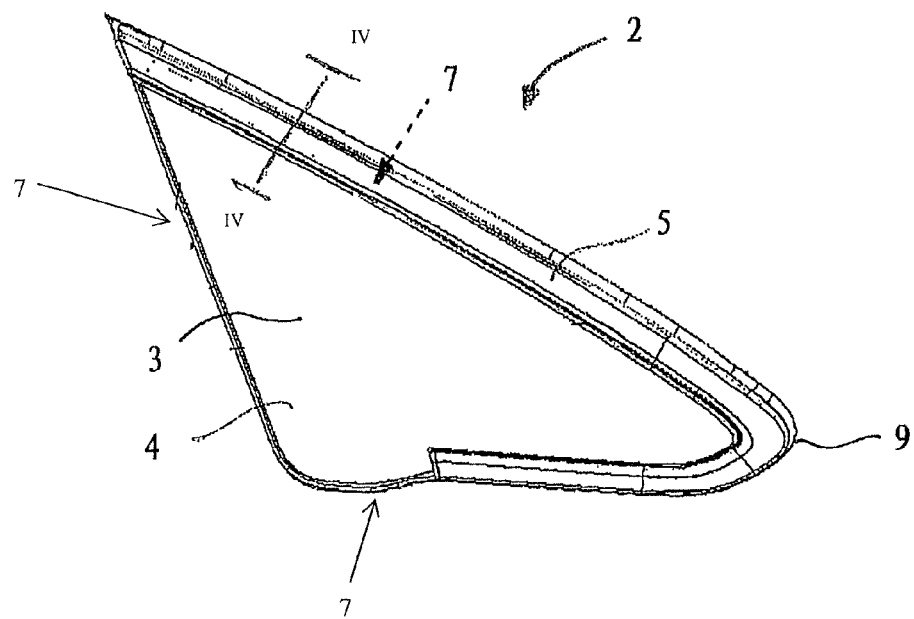
FIG. 2 is a schematic plan view of a front quarter light vehicle glazing in accordance with the present invention.
Figure 4:
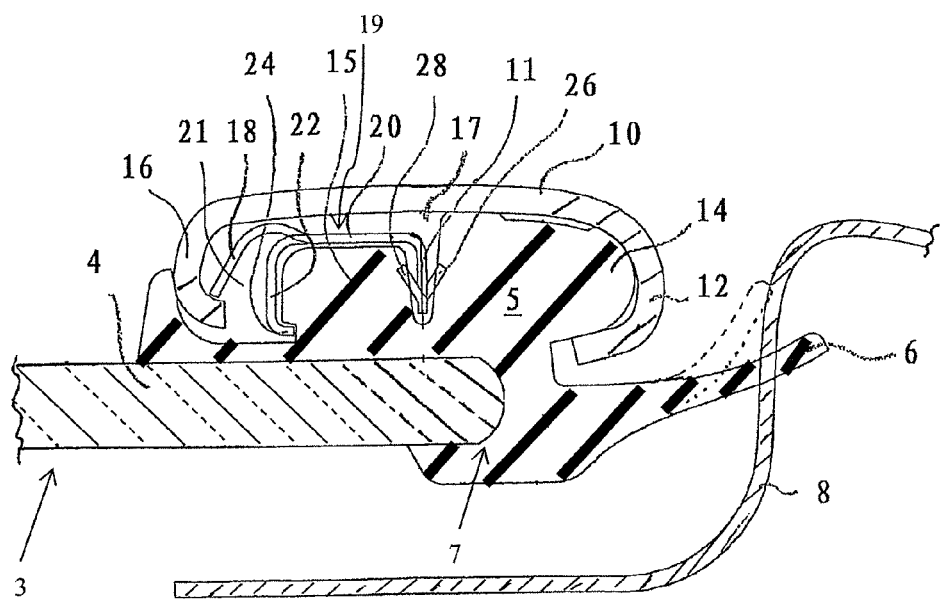
FIG. 4 is a schematic cross-section taken on line A-A of FIG. 2, showing a second embodiment of the retaining clip in accordance with the present invention.
Figure 5:
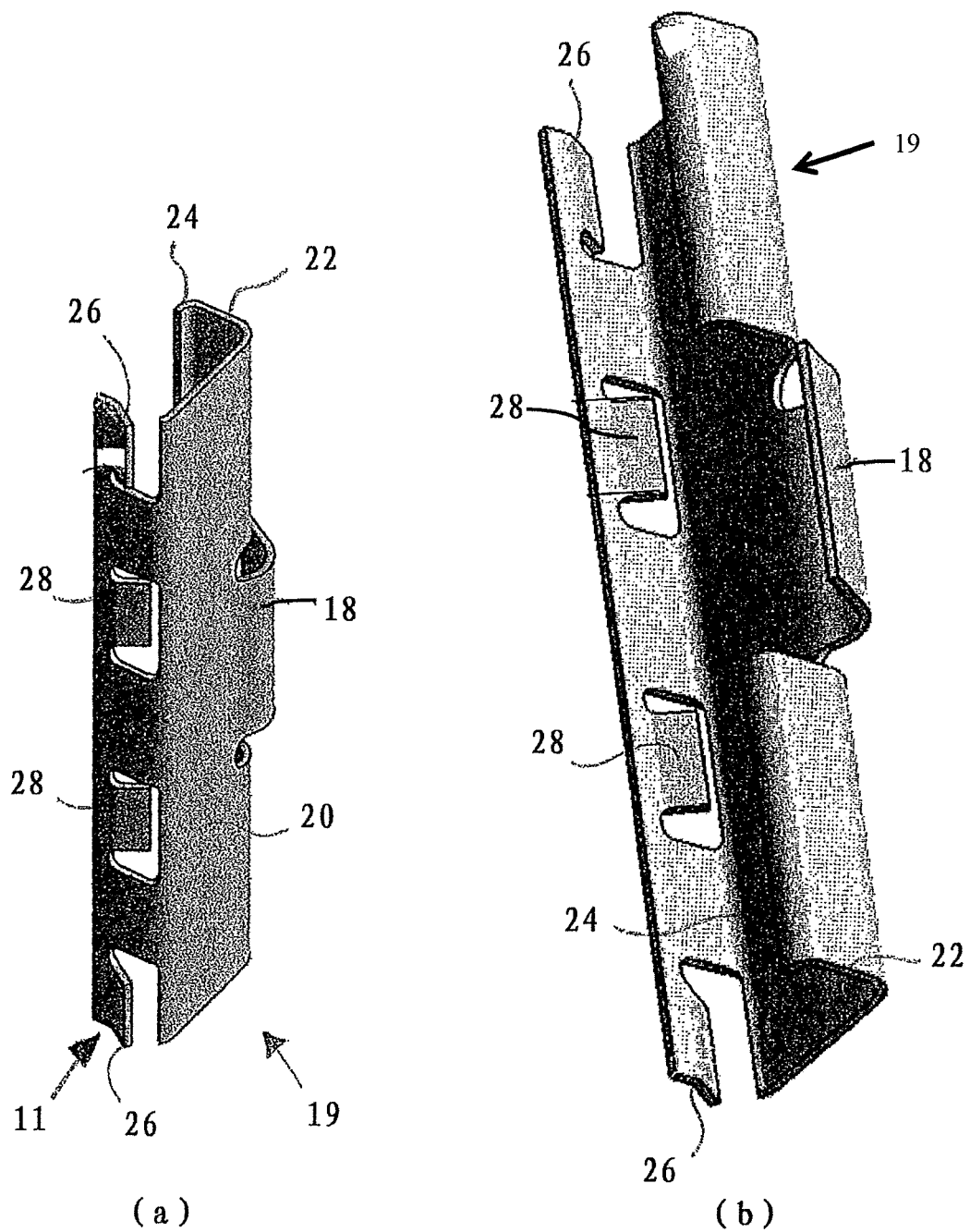
FIGS. 5 (*a*) and 5 (*b*) are perspective views of the second embodiment of the retaining clip in accordance with the present invention.

FIG. 2 shows a front quarter light vehicle glazing 2 of generally triangular shape installed in a car body (not shown). The vehicle glazing 2 comprises a sheet of glazing material in the form of a pane of glass 4 having a surface 3 and edges 7. The glazing further comprises a gasket 5 extending along the long edge of the glazing 2, around the corner 9, and onto a portion of one of the short edges. The gasket 2 is designed to fit and co-operate with a retaining clip according to the invention as illustrated in FIGS. 3, 4 and 5. The gasket is provided with a specially shaped ridge for this purpose, which is described more fully below.

FIG. 3 illustrates one embodiment of a resilient asymmetric metal retaining clip 19 according to the invention. The retaining clip 19 has a generally U-shaped configuration in section, comprising a base portion 31 and two limbs in the form of depending arms 33, 35 which constitute the sides of the "U". When the clip 19 is installed on a gasket, the arms 33, 35 fit on either side of a ridge in the gasket. One arm 33 is provided with means for engaging a gasket in the form of lugs 39, 41. Arm 33 has two mutually diverging lugs 39, 41 which, when the retaining clip 19 is installed on a gasket, fit into a narrow groove between the ridge and the main body of the gasket and act as barbs to resist withdrawal of the clip 19 from the gasket. The lugs may have serrations, teeth, or other sharp, angular forms to improve their grip on the gasket. Curved arm 35 is shaped so as to fit an undercut portion of the ridge of the gasket. The flange or tab 37 extending from the base portion 31 is shaped to fit and retain one side of a trim to be fitted to the gasket. The overall shape of the clip is asymmetric about a plane which bisects the "U" and is perpendicular to the plane in which the "U" lies.

FIG. 4 shows a cross section through the glazing of FIG. 2 on line A-A. In this Figure, the vehicle bodywork 8 and a vehicle glazing component in the form of a decorative trim strip 10 are also shown. The edge 7 of the glass 4 has an encapsulated gasket 5 with a lip 6 intended to form a seal against car body 8. The gasket 5 has a protuberance 14 and a shaped ridge 15 with a narrow groove 17 on one side nearer the protuberance 14 and a broader channel 21 on the other side, towards the centre of the glazing. A second embodiment of retaining clip 19 has a base 20 and first and second limbs in the form of depending arms 22 and 11 which are shaped to fit on the ridge 15. The first arm 22 of the retaining clip has a curved lip 24 to fit an undercut on the ridge 15. The second arm 11 has mutually diverging lugs 26 and 28, acting as barbs to resist withdrawal from the groove 17, and directed towards the protuberance 14 and away from the protuberance 14 respectively. With respect to the retaining clip, a first barb is directed towards the other limb 22, and a second barb is directed away from it. There may be multiple barbs of either type, depending on the length of the clip and the level of grip required. A flange or tab 18 extends from the base 20 of the retaining clip and is shaped to retain the first side 16 of the trim 10. The channel 21 is broad enough to allow space for the side 16 of the trim and tab 18 to cooperate. The protuberance 14 is shaped to fit and retain the second side 12 of trim 10.

FIGS. 5(a) and 5(b) show perspective views of the second embodiment of retaining clip 19 as illustrated in use in FIG. 4. The retaining clip 19 is elongate with a base 20 from which depend arms 22 and 11 to form an elongate channel for fitting over the ridge 15 of the gasket 5. The clip has a longitudinal axis extending parallel to the direction of elongation of the channel. Arm 11 has mutually diverging lugs 28, 26 directed into and away from the elongate channel respectively. The lugs 26 are shown with an open edge, and the edge of the lugs may be serrated or otherwise provided with teeth to improve the grip of the lugs in the gasket. To strengthen these lugs 26 there may be material connecting the open edge to the base 20. The arm 22 has a curved lip 24 shaped to fit an undercut on the ridge 15. There is a flange or tab 18 extending from the base 20 and shaped to fit an edge of the trim, when the clip is position in the gasket. Although the clip is again generally U-shaped in cross-section, the overall shape of the clip is asymmetric about a plane bisecting its U-shaped cross-section. This plane is perpendicular to the elongate base 20 and also, when the clip is positioned in use, to the surface of the ridge 15; the plane is parallel to the arms, 22, 11 and the longitudinal axis of the clip.

The retaining clip is preferably formed from spring steel, and may have a corrosion-resistant coating. The retaining clip may be pressed and bent into the shape of a channel, with lugs 26 and 28 being stamped out before or after shaping.

Preferably, the length of the base 20 and hence of the elongate retaining clip is in the range 10 to 80 mm, more preferably 20 to 60 mm, with the height of the arms 11 and 22 being in the range of 1 to 5 mm, preferably 2.0 to 3.5 mm.

The base may be continuous, i.e. free from slots, perforations or other apertures. Several clips of either or each embodiment may be required to fit one trim 10 to an edge of a vehicle glazing.

The gasket 5 may be formed from a polymer material, preferably a polymer material suitable for use with a rapid injection moulding process, as described in EP 0 792 209 B1, or an extrusion process. It may be desirable to use an extrusion technology, again to extrude a polymer material, or a bonding technology, such as that known as bond-on-lace, in place of encapsulation, to form the gasket 5.

Use of a retaining clip in accordance with the present invention results in a significant drop in the maximum height of the surface of the trim above the surface of the vehicle glazing.

Although the examples above relate to the mounting of a glazing trim, it is also possible to use the retaining clip of the present invention to mount other vehicle glazing components. For example, the retaining clip may be used to mount a waterproof cowling and/or water tray along the bottom edge of a windscreen. Suitable vehicle glazing components are those that require positioning along an edge of a vehicle glazing, making them ideal for use with a retaining clip in accordance with the present invention. In addition, it may be desirable that the gasket into which the retaining clip is fitted has a lip portion only along a portion or its length, or is provided without a lip portion, depending on the position of the gasket on the vehicle glazing and the ultimate position of the vehicle glazing within a vehicle.

The invention claimed is:

1. A resilient asymmetric metal retaining clip for retaining a vehicle glazing component, the retaining clip comprising a generally U-shaped section, the U-shaped section including a base and two limbs, the first limb comprising means for engaging a gasket, and the second limb comprising a tab extending outwardly from the second limb for engaging a vehicle glazing component, wherein the means for engaging the gasket comprises at least two lugs extending from the first limb in mutually diverging directions.

2. A retaining clip as claimed in claim 1, wherein the lugs are provided with serrations, teeth or other angular elements in order to grip the gasket.

3. A vehicle glazing comprising a gasket provided on at least one surface, the gasket extending along at least a portion of one edge of the glazing, and provided with at least one resilient asymmetric metal retaining clip for retaining a vehicle glazing component, wherein the retaining clip comprises a first limb for engaging the gasket, and a second limb retaining the vehicle glazing component:

the vehicle glazing component possessing a first side and a second side, the retaining clip retaining the first side of the vehicle glazing component;

the gasket comprises a retaining gasket portion, the retaining gasket portion retaining the second side of the vehicle glazing component;

the second side of the vehicle glazing component bending around an outer surface of the retaining gasket portion, the second side of the vehicle glazing component possessing an inner surface facing the first side of the vehicle glazing component; and the inner surface of the second side of the vehicle glazing component being in direct contact with the outer surface of the retaining gasket portion.

4. A vehicle glazing as claimed in claim 3, wherein the vehicle glazing component is a glazing trim.

5. A vehicle glazing as claimed in claim 3, wherein the gasket comprises a channel adapted to receive the first side of the vehicle glazing component.

6. A vehicle glazing as claimed in claim 3, wherein the gasket comprises a groove adapted to fit the first limb of the retaining clip.

7. A vehicle glazing as claimed in claim 3, wherein the asymmetric retaining clip comprises a flange or tab extending to one side of the clip.

8. A vehicle glazing as claimed in claim 3, wherein the retaining clip is in the form of an elongate channel having a U-shaped cross-section.

9. A vehicle glazing as claimed in claim 3, wherein the retaining gasket portion has a protuberance directed away from the first side of the vehicle glazing component.

10. A vehicle glazing as claimed in claim 9, wherein the protuberance is curved.

11. A vehicle glazing as claimed in claim 3, wherein the gasket comprises a ridge adapted to fit the retaining clip.

12. A vehicle glazing as claimed in claim 11, wherein the ridge is a recessed ridge.

13. A vehicle glazing as claimed in claim 11, wherein the ridge has an undercut region adapted to fit a part of the retaining clip.

14. A vehicle glazing as claimed in claim 11, wherein the retaining clip is formed such that the retaining clip comprises a channel portion adapted to fit the ridge of the gasket.

15. A vehicle glazing as claimed in claim 14, wherein the channel portion comprises a curved lip adapted to fit an undercut region of the ridge of the gasket.

16. A vehicle glazing as claimed in claim 14, wherein the channel portion comprises a first barb adapted to fit a gasket groove, the first barb being directed towards the asymmetric retaining clip.

17. A vehicle glazing as claimed in claim 16, wherein the channel portion comprises a second barb adapted to fit the gasket groove, the second barb being directed away from the asymmetric retaining clip.

* * * * *